United States Patent [19]
Christ

[11] Patent Number: 6,089,816
[45] Date of Patent: *Jul. 18, 2000

[54] ARTICLE LOAD APPARATUS

[76] Inventor: Duane J. Christ, 3428 Parkland Dr., West Bloomfield, Mich. 48322

[ * ] Notice: This patent issued on a continued prosecution application filed under 37 CFR 1.53(d), and is subject to the twenty year patent term provisions of 35 U.S.C. 154(a)(2).

[21] Appl. No.: 09/257,571

[22] Filed: Feb. 25, 1999

Related U.S. Application Data

[60] Provisional application No. 60/075,861, Feb. 25, 1998.

[51] Int. Cl.[7] .................................................. B65G 67/02
[52] U.S. Cl. ............................................ 414/538; 414/500
[58] Field of Search ..................... 414/538, 500, 414/537, 498; 410/30, 7, 9, 19; 188/32

[56] References Cited

U.S. PATENT DOCUMENTS

| | | | |
|---|---|---|---|
| 3,857,504 | 12/1974 | Bausenbach et al. | 414/500 |
| 4,020,961 | 5/1977 | Musgrove | 414/500 |
| 4,913,614 | 4/1990 | O'Rarden | 414/500 |
| 4,930,799 | 6/1990 | Pihlstrom et al. | 414/500 |
| 4,954,038 | 9/1990 | Sheahan | 414/538 |
| 5,249,910 | 10/1993 | Ball | 414/538 |
| 5,394,583 | 3/1995 | Plate | 414/538 |
| 5,431,525 | 7/1995 | Scott | 414/538 |
| 5,511,929 | 4/1996 | Loftus | 414/538 |
| 5,542,810 | 8/1996 | Florus | 414/538 |
| 5,556,249 | 9/1996 | Heine | 414/500 |
| 5,586,849 | 12/1996 | Kissel et al. | 410/30 |
| 5,730,577 | 3/1998 | Jones | 414/538 |
| 5,810,546 | 9/1998 | Schmoling | 414/538 |

*Primary Examiner*—Gregory A. Morse
*Attorney, Agent, or Firm*—Young & Basile, PC

[57] ABSTRACT

An article load apparatus for easily loading and unloading articles, particularly motorized vehicles, onto a load carrying surface of another vehicle. The article load apparatus includes a mobile cart having a base for carrying an article. A power drive is mountable on the vehicle for moving the cart between a first position on the load carrying surface of the vehicle and a second position displaced from the load carrying surface. The cart is releasably lockable to a support member on the vehicle. A channel member is carried on the base for guiding and supporting an article. Tie down members on the base receive straps for securing an article to the cart. A chock is optionally mounted on the base for receiving a wheel of a wheeled article. A support frame is mountable on the vehicle and carries an electric motor driven winch having an extendable cable connectable to the base.

18 Claims, 5 Drawing Sheets

ARTICLE LOAD APPARATUS

CROSS REFERENCE TO CO-PENDING APPLICATION

This application claims the benefit of the priority date of Provisional Application Ser. No. 60/075,861, filed Feb. 25, 1998 in the name of Duane J. Christ and entitled "ARTICLE LOAD CART", the entire contents of which are incorporated herein by reference.

BACKGROUND OF THE INVENTION

Motorcycles, jet skis, snowmobiles and ATVs are popular recreational vehicles. While motorcycles can be rode from place to place, it is typically necessary for a user to transport a jet ski, snowmobile, ATVs, etc. from a home or storage location to the use site. Typically a trailer is employed to transport such vehicles. While effective and somewhat easy to load with the snowmobile, jet ski, etc. Trailers created disadvantages when they are towed behind a vehicle. Not only must a particular sized vehicle be employed which has sufficient power to pull the trailer and the weight of the carried load, the weight of the trailer and load reduce the gas mileage of the vehicle. Further, trailers are difficult to back up or maneuver in tight quarters and create problems on the road, particularly for an inexperienced driver during inclement weather conditions.

Such vehicles have also been loaded directly into the bed of a pickup truck. Special mounting brackets, etc., have been devised to fixedly retain such vehicles in position in a truck bed, particularly for motor cycles. However, such brackets, which are typically bolted or otherwise secured to the truck bed or surrounding structure frequently interfere with the use of the truck bed for its normal intended purpose when not carrying a motorcycle or other vehicle.

Carrying such vehicles on the truck bed of a truck poses a significant problem in so far as loading and unloading such vehicles onto the truck bed. Ramps are employed to provide an incline surface between the elevated truck bed and the ground. While unloading is relatively easy, since the motorcycle can be easily rolled down the ramp using gravity, the 700–1,000 lb. weight of a typical motorcycle could still cause problems due to the momentum generated rolling down the ramp. Further, jet skis and snowmobiles do not roll as easy.

Thus, it is frequently necessary for a user of such vehicles to require the assistance of one and usually two additional people to assist in pushing the motorcycle or other vehicle up the ramp as well as controlling the vehicle as it rolls down the ramp. The present invention addresses these problems.

SUMMARY OF THE INVENTION

The present invention is an article load apparatus for loading and unloading articles, particularly motorized recreational vehicles, onto and from a loading carrying surface of a vehicle, such as a truck.

In one aspect of the present invention, the article load apparatus includes a mobile cart formed of a base, wheels mounted on the base, and power means, mountable on the vehicle and coupled to the cart, for moving the cart between a first position on the load carrying surface and a second position displaced from the load carrying surface.

Means are provided for releasably locking the cart to the vehicle. In one aspect, the locking means comprising a lock plate carried on the cart. A lock pin releasably attaches the lock plate to a vehicle support surface or a support member mountable on a vehicle. The support member may comprise a frame having at least one horizontally extending cross member. At least one and, preferably, a plurality of spaced apertures are formed in the cross member for receiving the lock pin to releasably lock the cart to the support frame and to the vehicle in a fixed, non-movable position.

Tie down members may be provided on the cart for receiving straps to secure an article on the cart. Optionally, an article guide and support is mountable on the base for guiding movement of an article relative to the base and for supporting the article on the base. Preferably, the article guide and support is of a channel member for receiving a component, such as a wheel, of an article.

A chock may be mounted on the base for receiving and supporting a front wheel of a wheeled article. Optionally, the chock may include a biasing member which is pivotally connected to one end to the frame. The biasing member is lockable in a generally flat position, co-planar with the base of the cart and is nominally biased upwardly, when unlocked, to engage the article wheel, such as a front wheel of a motorcycle, and to bias or force the front wheel into the front chock and to prevent movement of the vehicle relative to the frame.

The power means, in one aspect of the inventions, comprises an electric motor driven winch mountable on the vehicle and/or a support frame fixedly attached to the vehicle. A cable is extendably wound on the winch and is releasably connected to the cart. A pulley may be interposed between the winch and the cart for routing the cable from the winch drum to the cart base. A pin releasably attaches the pulley to one of the apertures in the horizontally extending support member.

The article load apparatus of the present invention provides significant advantages with respect to easily loading and unloading articles, particularly motorized recreational vehicles, to and from the bed of the pickup truck. The present article load apparatus eliminates the need for specialized brackets mounted in the side or floor of the truck bed which can interfere with normal use of the truck bed. More importantly, the present article load apparatus enables a single person to easily load and unload an article onto the cart and to load and unload the cart onto and from the truck bed thereby eliminating the need for assistance from other people. Further, the article load apparatus provides a controlled loading and unloading operation for enhanced safety to the user.

The cart of the present article load apparatus can be easily adapted by means of different support members for receiving different shaped articles, motorized vehicles or other cargo. Finally, the cart of the present load apparatus can also function as a mobile base for an article, such as a wheeled recreational vehicle, i.e., a motorcycle, jet ski, snowmobile, ATV, etc., and enables easy movement of the wheeled vehicle throughout a garage, repair or storage facility.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

In the following description, the load cart 10 of the present invention is described as being specifically designed for use in carrying a motor cycle. However, it will be understood that the load cart 10 with minor modification, may be constructed for loading or carrying any article, such as motorcycles, bicycles, jet skis, snowmobiles, ATVs, as well as cargo, such as boxes, crates, etc.

Figures 1, 3:
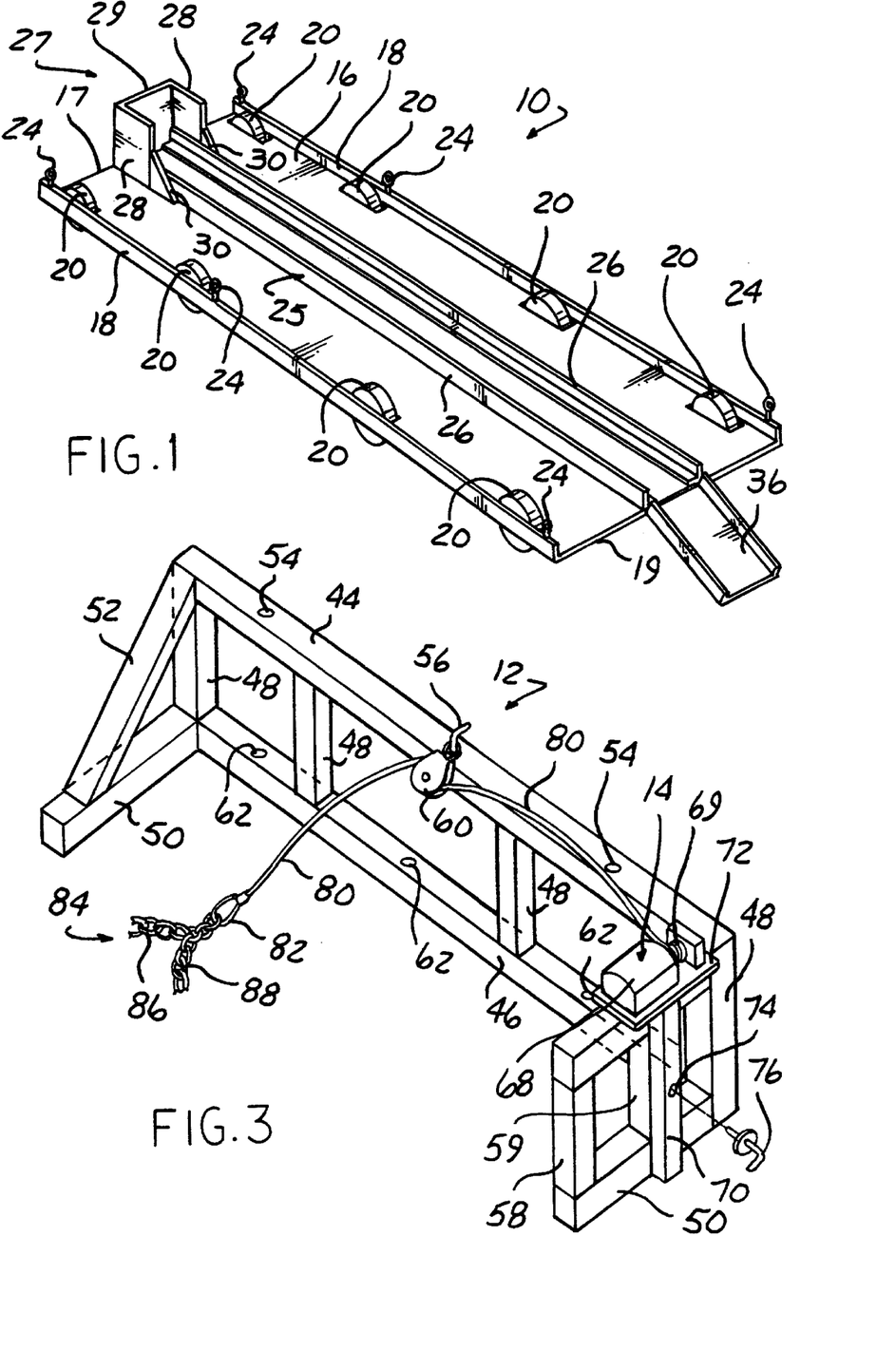
FIG. 1 is a perspective view of a load cart forming part of an article load apparatus of the present invention.
FIG. 3 is a perspective view of the frame and winch components of the article load apparatus.
Figures 2, 5:
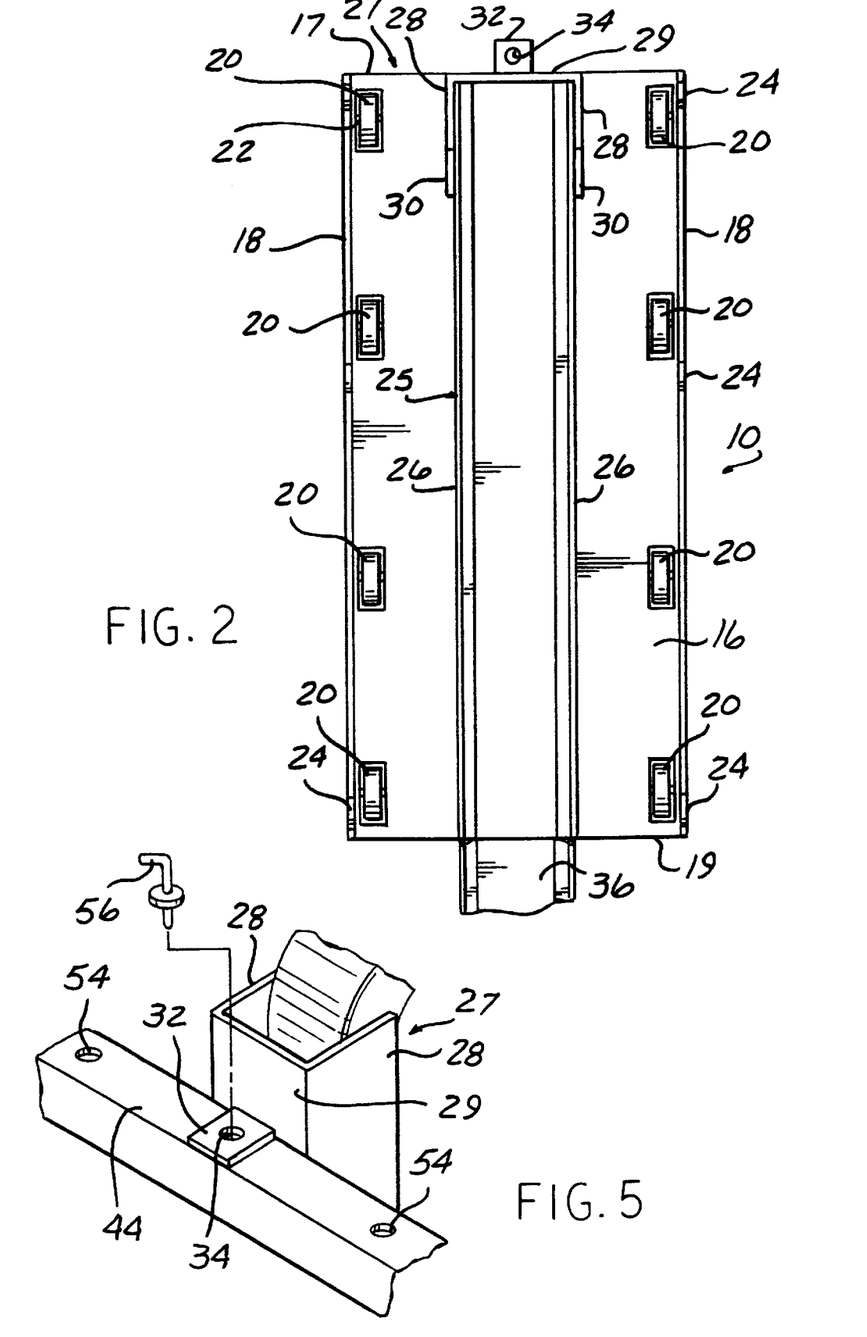
FIG. 2 is a plan view of a load cart shown in FIG. 1.
FIG. 5 is a partial, perspective view showing the locking of a load cart onto the frame into the truck bed.

As shown in FIGS. 1 and 2, the load cart 10 includes a base 16 of generally planar construction. The base 16 is formed of a high strength material, such as aluminum, steel, and possibly high strength, engineered plastics. The base 16 may be in the form of a solid sheet or diamond plate, grating, etc. A pair of side rails 18 are mounted on opposite sides of the base 16 and extend longitudinally along the entire length of the base 16 above and below the sides of the base 16.

A plurality of rollers or wheels 20 are mounted in apertures in the base 16 by means of axles 22 which are rotatably supported on the underside of the base 16 by mounting flanges, not shown, on the underside of the base 16 and a bushing in an aperture in the side rails 18. The rollers or wheels 20 may be provided in any number along the length of the base 16 and are generally located on the outer side of the base 16 adjacent to the side rails 18 in aligned pairs. In a preferred embodiment, the rollers or wheels 16 are formed of rubber or urethane. Other materials may also be employed for the rollers or wheels 20.

As also shown in FIGS. 1 and 2, a plurality of tie down members or eyelets 24 are mounted on the side rails 18 and spaced along the length of the side rails 18. Three pairs of opposed eyelets 24 are depicted as mounted on the side rails 16 by way of example only. The eyelets 24 are welded or mounted to the side rails 18 by fasteners, etc; and provide a convenient means for receiving tie down straps, as described hereafter, to secure an article, such as a motorcycle, on the load cart 10.

An article support means 25 is mounted on the base 16 and extends longitudinally for at least a portion of the length of the base 16. In a preferred embodiment, the article support means 25 comprises a pair of center supports 26 in the form of elongated angle irons which are welded or affixed to the base 16 by means of suitable fasteners. It will be understood that although the center supports 26 are illustrated as extending continuously along the entire length of the base 16, the center supports 26 may also be provided in separate, generally aligned sections at spaced intervals along the length of the base 16.

The height of the center supports 26 from the base 16 is selected to securely guide and support the article to be carried by the base 16. In the present example, the center supports 26 have a height sufficient to guide and support the wheels of a motorcycle onto the base 16 on the load cart 10.

A front chock 27 is mounted at one end of the base 16, which is hereafter referred to as the front end 17. The front chock 27 is formed of a pair of side legs 28 which are interconnected by an end wall 29. Side braces 30 are connected between one edge of the side legs 28 and the base 16. Further, the entire chock 27 is welded to the base 16 as shown in FIGS. 1 and 2.

A front lock plate 32, shown in FIGS. 2 and 5, is welded to and extends forward of the end wall 29 of the front chock 27. An aperture 34 is formed in the front lock plate 32 for securing the load cart 10 to the front frame 12 as described hereafter.

Finally, a short ramp 36, generally of planar construction and with or without side walls, is pivotally mounted to the rear end 19 of the base 16 in line with the center supports 26 to enable an article, such as a motorcycle, to be rolled onto or from the cart 16 despite the short elevation of the base 16 above the ground due to the rollers or wheels 20. The ramp is movable between a non-use position extending angularly upward from the base 16 and an included use position, shown in FIG. 1. Alternately, the ramp 36 can be separate from the base 16 and merely attached to the base 16 in the use position.

Referring now to FIGS. 3 and 5, the front frame 12 includes a horizontal upper tubular member 44 and a spaced, generally parallel lower horizontal tubular member 46 which are connected by a plurality of vertically extending upright members 48. Opposed, generally parallel side legs 50 extend from opposite ends of the lower tubular member 46. A side brace 52 is interconnected between one end of the upper tubular member 48 and one side leg 50 as shown in FIG. 3. A winch support leg 58 projects upwardly from the opposite side leg 50.

A plurality of laterally spaced apertures 54, such as three apertures 54 in a preferred embodiment, are formed in the upper tubular member 44. The apertures 54 provide the dual functions of receiving a hinge pin 56 to releasably attach a hook or eyelet on a pulley 60, as shown in FIG. 3, to the front frame 12 or to lock the front lock plate 32 of the front chock 27 in a desired lateral position between the side legs 50 of the frame 12. In this manner, a single load cart 10 may be centrally located with respect to the frame 12 by interconnection of the front chock lock plate 32 in the central aperture 54. A single load cart may also be connected to one lateral side of the frame 12 in one of the outboard apertures 54. Similarly, two side by side positioned load carts 10 may be interconnected to the frame 12 by means of hinge pins 56 in the outboard apertures 54.

The upper and lower tubular members 44 and 46, the upright members 48, the side legs 50, the side brace 52 and the winch support legs 58 and 59 are preferably formed of hollow steel tubes which are interconnected in the illustrated arrangement by means of fasteners, welding, etc. Further, the entire frame 12 is securable to a truck bed, generally adjacent the end of the bed next to the truck cab, by means of fasteners, such as bolts, extendable through apertures 62 in the bottom tubular member 46. This enables the entire frame 12 to be removed from the truck bed when not in use.

Power means 14 are provided for moving the load cart 10 into a lockable position adjacent to the frame 12 or to separate the load cart 10 from the frame 12. This movement of the load cart 10 relative to the frame 12 is in conjunction with standard truck ramps 64 shown in FIG. 4 which may have any desired shape and length and which are removably connectable between the rear end of a truck bed 66 or tail gate and the ground, floor, etc. Although a single large ramp 64 may be employed, in a preferred embodiment, two, elongated, narrow width ramps 64 are employed and connected to the rear end of the truck bed 66 at a spacing to receive the rollers 20 on the load cart 10. The power means 14 preferably comprises an electric winch 68, such as a 12 volt electric winch having a 2,500 lb. capacity. This enables, the winch 68 to be connected to the vehicle battery for operation. The winch 68 is preferably removably mounted to the frame 12 by means of a removable assembly formed of a hollow, tubular support leg 70 having a perpendicular disposed support plate 72 mounted at one end. The winch 68 is fixedly mounted on the plate 72.

Further, an aperture 74 in the support leg 70 is aligned with a similar aperture in the winch support leg 59 to receive a hinge pin 76 for releasably attaching the support leg 70 to the winch support leg 58.

The winch 68 carries an elongated, high strength cable 80 wound around a rotatable drum 69 driven by the winch motor. The cable 80 is preferably an aircraft grade cable in any desired length, such as 25 feet, which is wound about the winch drum 69 at one end and is extendable through the pulley 60 when the pulley 60 is attached by the hinge pin 56 to one of the apertures 54 in the upper tubular member 44 of the frame 12. The other end of the cable 60 is fixed in a connector or clip 82 which removably receives one end of a chain 84, shown in FIG. 3. The chain 84 is formed of two elongated chain sections 86 and 88 each having a hook, not shown, at an outer end which is engagable with one of the eyelets 24 along the sides of the load cart 10.

A 10 foot electrical conductor and remote control push buttons may be connected to the winch 14 for operating the winch remote from the truck.

Figures 4, 6:
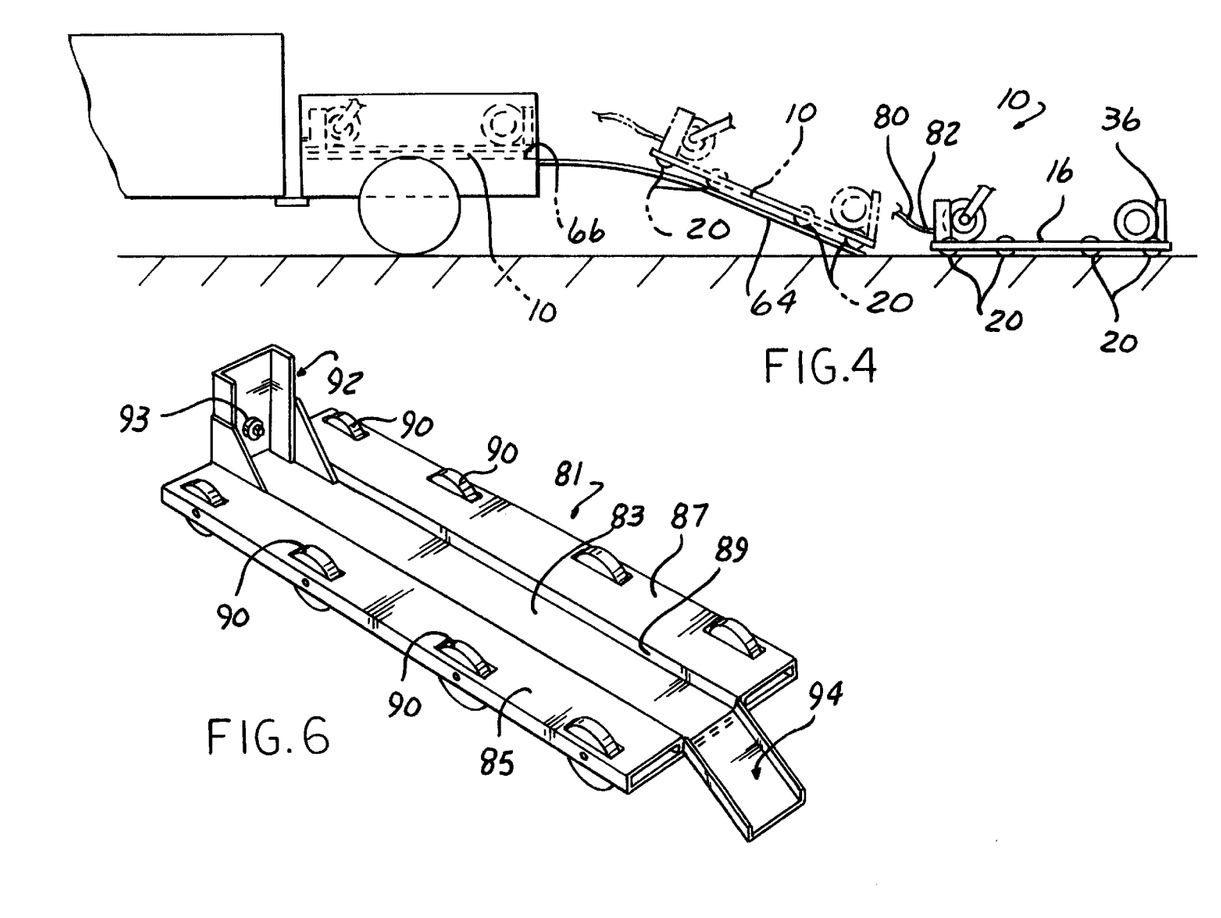
FIG. 4 is a pictorial representation depicting the loading and unloading of the load cart to and from a truck bed.
FIG. 6 is a perspective view of an alternate embodiment of a load cart according to the present invention.

Referring now to FIG. 4, there is depicted a pictorial representation of the use of the load cart 10 in loading and unloading an article, such as a motorcycle, by example only, into and out of the bed 66 of a truck.

Initially, the load cart 10 is disposed on the ground or floor. The cart ramp 36 is lowered to provide a surface from the ground to the top of the base 16 of the cart 10. The motorcycle or other article is then moved onto the cart. With the present load cart 10, a single person can push a heavy motorcycle typically weighing between 750 lbs. to 1,000 lbs. onto the load cart 10. A conventional handle bar stabilizer may be used to hold the front wheel in-line with the rear wheel during loading onto the load cart 10.

The motorcycle is pushed forward along the length of the base 16 of the cart 10 until the front wheel of the motorcycle securely engages the front chock 27. The cart ramp 36 is then raised to the elevated position shown in FIG. 4 and secured to the cart 10 by straps or bungee cords. Tie downs or straps are then wrapped around major components of the motorcycle, such as the frame and foot pegs, etc. and tied to the eyelets 24 to secure the motorcycle in the upright position on the load cart 10. The center supports 26 engage the sides of the motorcycle wheels to aid in holding the motorcycle upright.

The winch 68 is then activated to unwind the cable 80 from the winch drum 69. The cable 80 is unwound a sufficient length until the clip 82 on one end of the cable 80 can engage one end of the chain 84. The hooks on the end of the chain sections 86 and 88 are preferably wrapped around the frontmost eyelet 24 on the load cart 10 and secured to one of the intermediate eyelets 24. The winch 68 is then activated in an opposite direction to wind the cable 80 onto the winch drum 69. Via the pulley 60, this force moves the cable 80 toward the frame 12 and around the pulley 60 and pulls the load cart 10 up the ramps 64 and onto the truck bed 66 until the front chock 27 is disposed adjacent to the frame 12.

As shown in FIG. 5, the hinge pin 56, which has been removed from the aperture 54 in the upper tubular member 44 of the frame 12 to enable the pulley 60 to be removed from the front chock 27, can be reinstalled into the aperture 54 in the upper tubular member 44 through the aperture 34 in the front lock plate 32 on the front chock 27. This secures the load cart 10 in a fixed position relative to the frame 12.

Unloading of the motorcycle and load cart 10 from the truck bed 66 occurs in an opposite manner. With the winch 68 activated to allow extension from the cable 80, the load cart 10 can be slid downward along the ramp 64, with the cable 80 exerting a controlled breaking force due to its slow extension from the winch drum 68. The load cart 10 is slid down the ramps 64 until it rests on the ground. The tie down straps are removed and the cart ramp 36 lowered to enable the motorcycle to be rolled off of the load cart 10.

Referring now to FIG. 6, there is depicted an alternate load cart 81 of the present invention. In this embodiment, the load cart 81 is formed with a planar base 83 and a pair of longitudinally extending, box sections 85 and 87 which are spaced apart and located on the opposite longitudinal sides of the base 83. Inboard opposed walls of the box sections 85 and 87 define a central channel 89 which is sized to receive an article, such as the wheels of a motorcycle, etc. The box sections 85 and 87 may be formed as separate box members welded or otherwise affixed to the base 83 or as folded over extensions of the sides of the base 83.

A plurality of roller members or wheels 90 are mounted on the base 83 by means of axles carried in each box section 85 and 87.

As in the preceding embodiment of the load cart 10 shown in FIGS. 1 and 2, a front chock 92 is mounted, such as by welding, at the front end of the channel 89 on the base 83. An eyebolt 93 is mounted on the front chock 92. A pivotal cart ramp 94 is pivotally connected by hinge pins to the rear end of the base 83 and has one end aligned with the channel 89.

Figure 7:
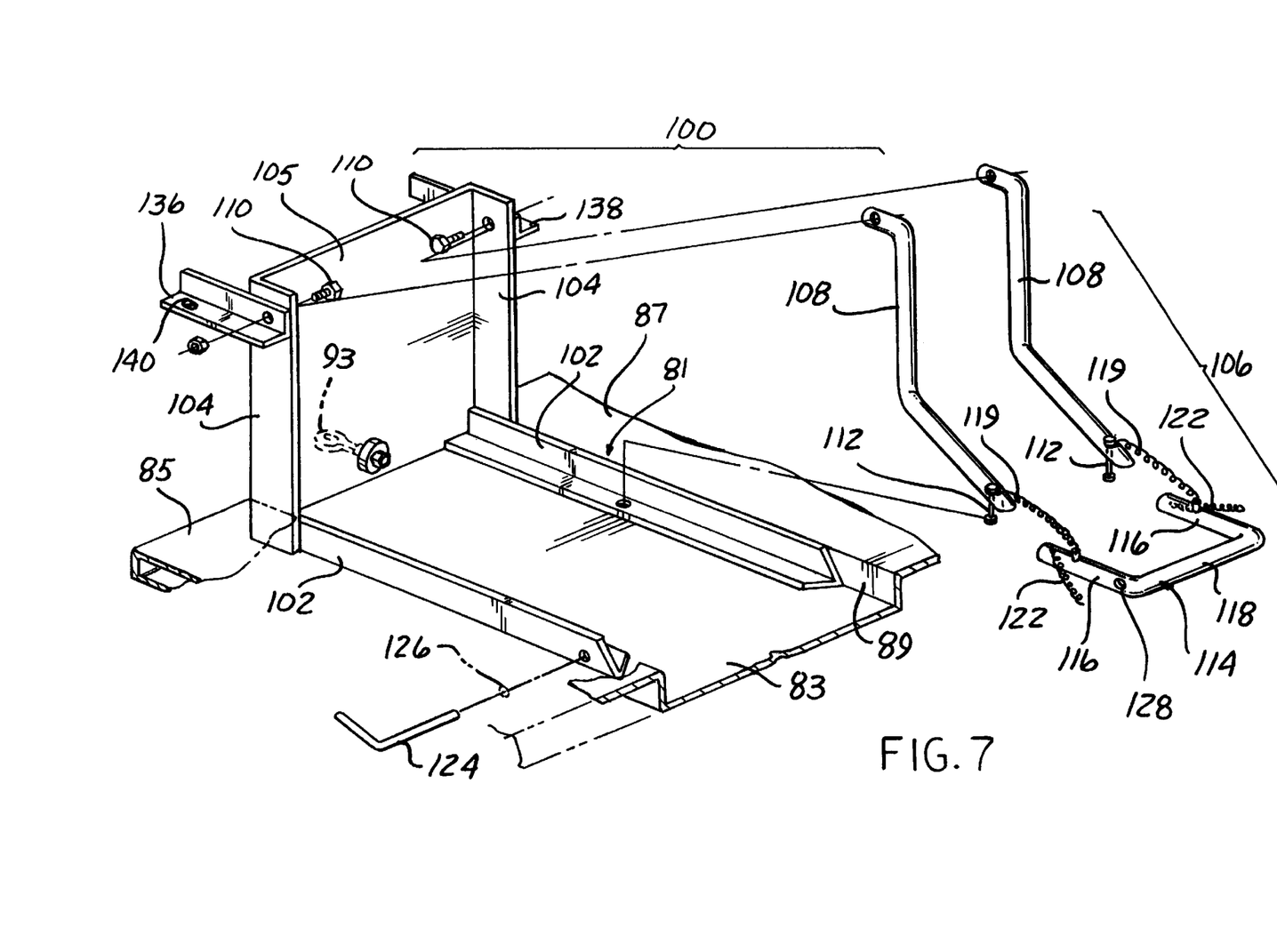
FIG. 7 is an exploded, perspective view of an optional front chock with biased cross bar.
Figure 8:
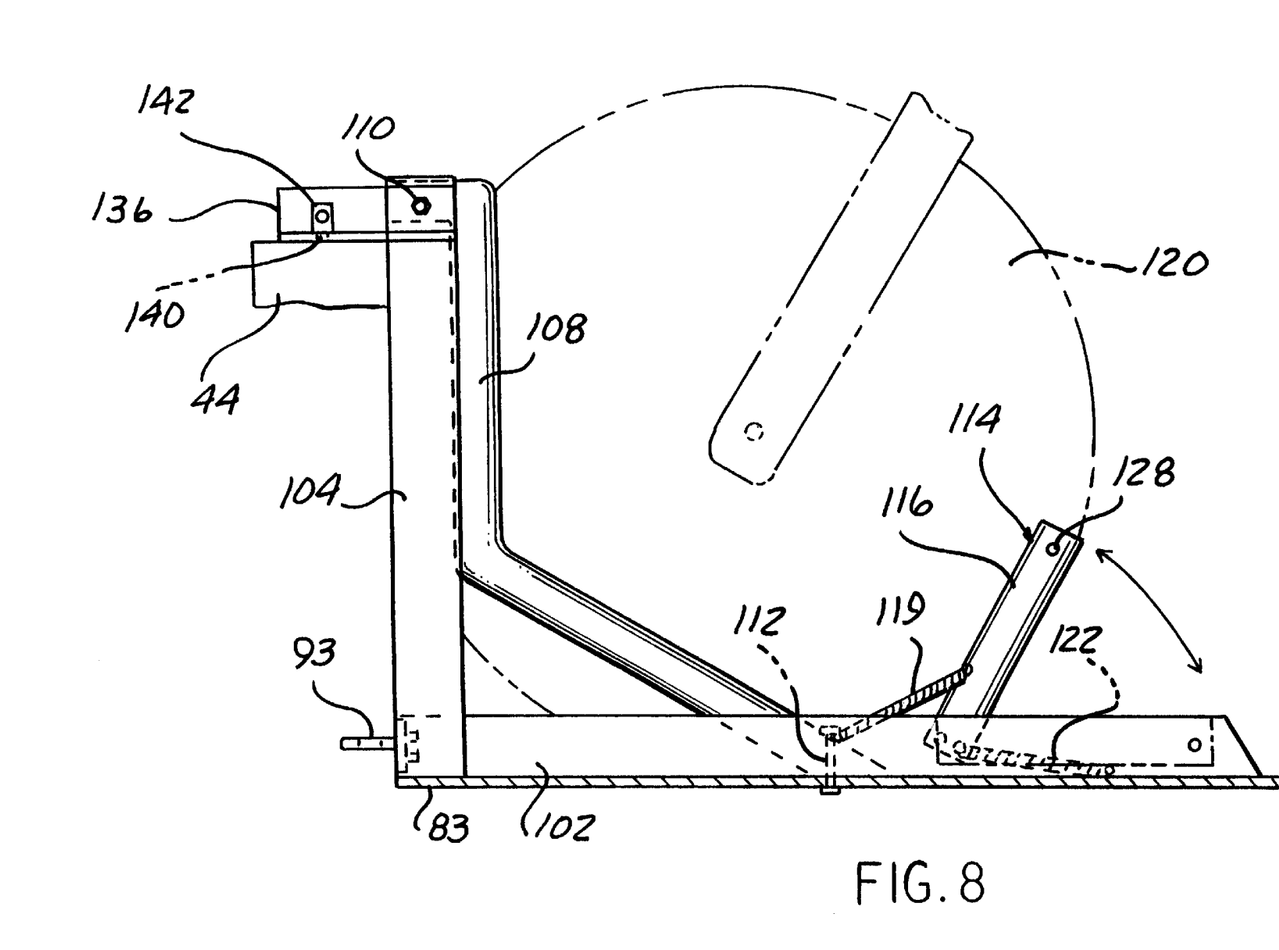
FIG. 8 is a side elevational view of the front chock shown in FIG. 7.

Referring now to FIGS. 7 and 8, there is depicted an optional front chock 100 which is mounted at one of the channel 89 on the base 83 of the load cart 81 shown in FIG. 6 or at the front end of the channel means 25 on the load cart 10 shown in FIG. 1.

In this aspect of the invention, the front chock 100 includes a frame formed of a pair of angle irons 102 fixedly mounted at one end of the channel 89 on the base 83. A pair of upright legs 104 on opposite sides of an end wall 105 are fixedly coupled in the channel 89 to the angle irons 102 and project upward from one end of the base 83. Apertures are formed in the upper ends of the upright legs 104 for receiving a fastener for affixing an article biasing apparatus 106 to the chock 100. An eyebolt 93 extends outward from the front chock 100 and is connectible to the clip 82 on the cable 80 to move the cart 81 as the cable 80 is retracted or extending from the winch drum.

The biasing apparatus 106 includes a pair of rigid support members 108 which are fixedly connected at an upper end to the upright legs 104 by fasteners 110. The supports 108 extend downwardly to a fixed connection by means of fasteners 112 to the base 83 or to the angle irons 102 mounted in the channel 89 of the base 83. A pivotal biasing member or cross bar 114 is pivotally disposed with respect to the supports 108. The biasing member or cross bar 114 is preferably in the form of a U-shaped member having opposed side legs 116 and an end member 118.

Both of the supports 108 and the biasing member 114 are preferably formed of rounded, tubular stock. For light weight, plastic pipe, such as PVC pipe, is employed to form the supports 108 and the biasing member 114.

An upper biasing means or coil spring 119 is fixedly connected at one end to a lower end of each of the supports 108 and extends to a fixed connection at an opposite end on one leg 116 of the biasing member 114. The coil springs 119 are arranged to normally bias the biasing member 114 away from a first position co-planar with the base 83 of the load cart 81, in which position the front wheel of a motor cycle or other vehicle can be rolled over the end 118 of the biasing member 114, and a pivoted in an upward, angled position shown in FIG. 8 in which the end member 118 firmly engages the rear of a wheel 120 of a motorcycle and forcibly biases the wheel 120 into the front chock 100.

The biasing force exerted by the springs 119 and 122 on each biasing member 114 forcibly urges the biasing members 114 against the rear surface of the wheel 120 of the motorcycle to forcibly trap the wheel 120 within the front supports 104 and end wall 105 of the chock 100 and to prevent movement, tipping, etc., of the motorcycle of the load cart 81. This enables the user to get off of the motorcycle without having to extend the kickstand.

A lower biasing member 122 or coil spring is connected between a bottom surface of each leg 116 of each biasing member 114 and a fixed connection at the angle iron 102 mounted on the base 83 of the load cart 81. The pairs of springs 119 and 122 cooperate with the springs 119 to normally bias the biasing member 114 upward to the second position shown in FIG. 8. However, after the article has been removed from the load cart 81, the user may exert force on the biasing member 114 to move the biasing member 114 downward to the first position generally overlaying the base 83 of the load cart 81. A lock bar 124 is then inserted through aligned apertures 126 in the box section 85 of the load cart 81 and aperture 128 in one leg 116 of the biasing member 114 to lock the biasing member 114 in the first position shown in FIG. 7. Aside from the cable 80 holding the cart 81 on the load surface or truck bed, additional locking capability is provided by at least one and preferably two latch arms 136 and 138. The latch arms 136 and 138 are in the form of angle irons pivotally connected to the sides 104 or the chock 100 by the fasteners 110. The latch arms 136 and 138 are movable from a vertical, non-use position to a use position shown in FIGS. 7 and 8 extending perpendicularly from the chock 100. IN the use position, an aperture 140 in each latch arm 136 and 138 is insertible over a pin 142 projecting upward from the upper tubular member 44 on the front frame 12. An aperture in the pin 142 can receive a pad lock for additional security.

In addition to the aforementioned advantages of enabling a single person to load and unload heavy articles, such as motorcycles, jet skis, snowmobiles, ATVs and other articles of cargo onto and off of a truck bed without the assistance of others, the present load cart apparatus also has other significant advantages. For example, the load cart can be used as a storage medium for a motorcycle since the motorcycle is retained in an upright position on the load cart by the tie down straps, the center supports and the front chock. The load cart may be moved around a garage or storage facility to simplify movement of the motorcycle without actually running the motorcycle engine. In a garage setting, the load cart also functions as a work platform since the motorcycle is held in an upright position off of the ground. In addition, with simple modifications to the shape and position of the center supports, the load cart can be adapted for carrying a different vehicle or article, such as a snowmobile, jet ski, ATV, etc.

More importantly, even though the load cart 10 enables a single person to load and unload an article, such as a heavy motorcycle, onto and off of a truck bed without requiring assistance from other individuals, potential damage to the motorcycle is minimized. Further, since the motorcycle or other article is securely retained on the load cart in the truck bed, the need for a separate trailer for the motor cycle or other article is eliminated. This increases driving safety as well as improving vehicle gas mileage. Finally, when empty, the load cart can be raised to an elevated position on one of the front or rear ends 17 or 19 for storage in a small upright position.

What is claimed is:

1. An article load apparatus for loading and unloading a wheeled article on a vehicle having a load carrying surface and a ramp extendable from the load carrying surface to the ground, the article load apparatus comprising:
   a cart, the cart including:
      a base for supporting the entire article;
      means, carried on the base, for providing mobility to the base;
      a channnular article guide and support mounted on the base and extending between opposed ends of the base, for guiding movement of an article relative to the base and for supporting the article on the base;
      a chock carried on the base and aligned with the article guide and support member for supporting wheel of an article having at least one wheel;
   a support member fixedly positionable on the vehicle at one end of the load carrying surface, distal from the ramp;
   means for releasably locking the cart to the support member;
   means for releasably securing the support member to the one end of the load carrying surface; and
   power means, mountable on the vehicle, for moving the cart between a first position on the load crying surface of the vehicle and a second position displaced from the load carrying surface.

2. The apparatus of claim 1 wherein the locking means comprises:
   a lock plate carried on the cart; and
   a lock pin releasably attachable to the lock plate and to the support member.

3. The apparatus of claim 2 wherein the lock pin is releasably engagable with the support member.

4. The apparatus of claim 1 wherein the means for providing mobility comprises:
   a plurality of wheels rotatably mounted on the base.

5. The apparatus of claim 1 further comprising:
   tie down members mounted on the base for receiving straps to secure an article to the base.

6. The apparatus of claim 1 further comprising:
   a ramp connectable to one end of the base for providing an inclined surface from the base to an underlying surface when the ramp is in an extended position.

7. The apparatus of claim 1 wherein the power means is mounted on the support frame.

8. The apparatus of claim 7 wherein the support frame includes:
   a horizontal cross member adapted to be mounted on the vehicle.

9. The apparatus of claim 8 further comprising:
   at least one aperture in the cross member.

10. The apparatus of claim 8 further comprising:
    a plurality of spaced apertures formed in the cross member.

11. The apparatus of claim 9 further comprising:

a lock plate fixedly mounted on the base; and a lock pin releasably attachable to the lock plate and the at least one aperture in the cross member for releasably fixedly mounting the base of the cart on the load carrying surface of the vehicle.

12. The apparatus of claim 9 wherein the power means comprises:

an electric motor driven winch;

a cable extendably wound on the winch; and means for connecting the cable to the base of the cart.

13. An article load apparatus for loading and unloading an article on a vehicle having a load carrying surface and a ramp extendable from the load carrying surface to the ground, the article load apparatus comprising:

a cart, the cart including;
    a base for supporting the entire article; and
    means, carried on the base, for providing mobility to the base;

a support member including a horizontal cross-member adapted to be fixedly positionable on the vehicle at one end of the load carrying surface, distal from the ramp, said cart releasably lockable to the horizontal cross-member, the horizontal cross-member including at least one aperture;

means for releasably securing the support member to the one end of the load carrying surface; and power means, mounted on the support member, for moving the cart between a first position on the load carrying surface of the vehicle and a second position displaced from the load carrying surface, the power means including:

an electric motor driven winch;

a cable extendably wound on the winch;

means for connecting the cable to the base of the cart;

a pulley receiving the cable between the winch and the connecting means; and a pin releasably attaching the pulley to the at least one aperture in the cross member.

14. The apparatus of claim 1 wherein the power means comprising:

an electric motor driven winch;

a cable extendably wound on the winch; and means for connecting the cable to the base of the cart.

15. The apparatus of claim 14 further comprising:

a pulley receiving the cable between the winch and the connecting means.

16. The apparatus of claim 1 further comprising:

a biasing member, pivotally mounted on the base and movable from a first position overlaying the base to an upward angled position with respect to the base, the biasing member engagable with a wheel of an article to bias the wheel into the chock.

17. The apparatus of claim 16 wherein the biasing member comprised:

a bar extending transversely to a longitudinal axis of the base of the cart; and at least one spring coupled to the bar for normally biasing the bar to the upward angled position.

18. The apparatus of claim 17 further comprising:

another biasing spring coupled between the bar and the base of the cart for normally biasing the bar to the upward angled position relative to the base.

* * * * *